United States Patent [19]
Stephenson et al.

[11] Patent Number: 5,105,341
[45] Date of Patent: Apr. 14, 1992

[54] WET TANTALUM CAPACITOR WITH LINER

[75] Inventors: Donald H. Stephenson, Plainfield; Kieth N. Green, Greencastle, both of Ind.

[73] Assignee: Yosemite Investment, Inc., Indianapolis, Ind.

[21] Appl. No.: 709,165

[22] Filed: Jun. 3, 1991

[51] Int. Cl.⁵ .............................................. H01G 9/10
[52] U.S. Cl. ..................................... 361/518; 29/25.03
[58] Field of Search ........................... 29/25.03, 25.42; 361/503, 508, 509, 512, 513, 517-520, 535-538

[56] References Cited

U.S. PATENT DOCUMENTS

| 3,120,695 | 2/1964 | Burnham | 29/25.03 |
| 3,297,918 | 1/1967 | Booe | 361/518 |
| 3,508,122 | 4/1970 | Baker | 361/503 |

Primary Examiner—Donald Griffin
Attorney, Agent, or Firm—Robert F. Meyer

[57] ABSTRACT

A tantalum electrolytic capacitor utilizes a tantalum liner in place of previously used silver liner thus permitting the capacitor to withstand a reverse dc voltage up to 3 VDC continuously with no serious degradation of electrical characteristics.

9 Claims, 1 Drawing Sheet

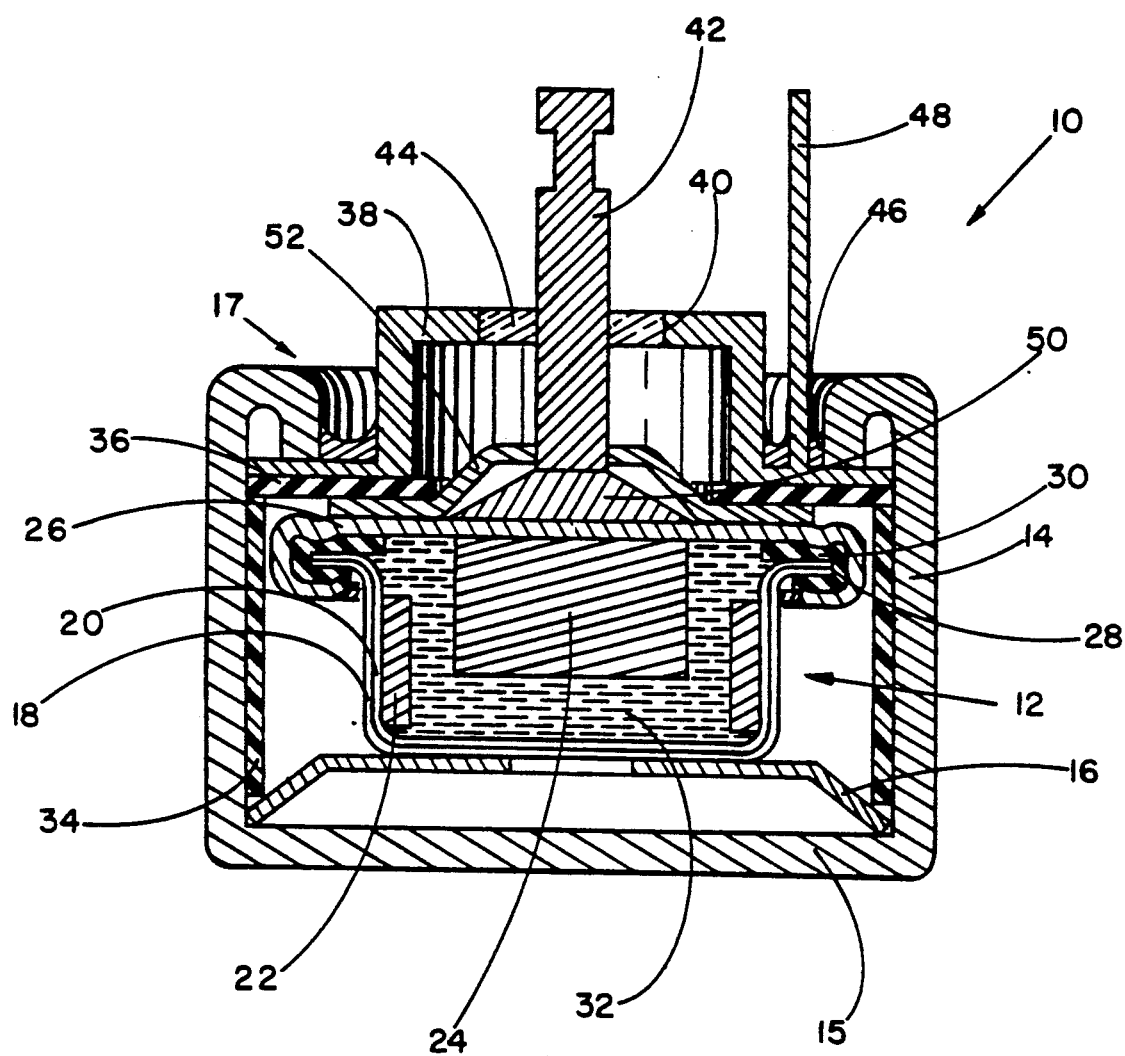

WET TANTALUM CAPACITOR WITH LINER

BACKGROUND OF THE INVENTION

The present invention relates to tantalum capacitors and more particular to wet tantalum capacitors using liquid electrolytes.

Wet tantalum capacitors have applications as a filter capacitor for power supplies. Typical of such capacitors are tantalum capacitors which utilize a silver liner inside a steel shell. Colloidal graphite is applied to the interior surface of silver liner and the silver-graphite serves as the cathode of the capacitor. The colloidal graphite is used to increase the capacitance of the cathode system.

The design has several major drawbacks which limit its applications or its performance life. If the finished capacitor is subjected to a reverse voltage of 1 volts dc, silver will dissolve in the electrolyte and electro-deposit on the surface of the anode. This will cause high dc leakage or a short circuit when voltage is applied in the correct polarity.

And when it is used under high ripple current conditions, such as a filter capacitor for a power supply, the colloidal graphite can become dispersed in the electrolyte. If the dispersed graphite makes intimate contact with the anode it will cause high dc leakage or a short circuit condition.

SUMMARY OF THE INVENTION

In accordance with the present invention the silver liner is replaced with a tantalum liner and then a sintered tantalum cathode is used inside the tantalum liner. The liner resists chemical attack by the liquid electrolyte.

Accordingly there is provided a capacitor body which in general comprises a metal shell, a tantalum liner carried within and against the metal shell, a tantalum cathode inside and against the tantalum liner, a tantalum anode, an electrolyte carried between the tantalum cathode and the tantalum anode, and electrical terminal means connected to the tantalum anode and tantalum cathode.

DESCRIPTION OF THE DRAWINGS

The sole FIGURE is a cross section of a capacitor employing the invention.

DETAILED DESCRIPTION OF THE INVENTION

Referring now to the drawing there is shown a capacitor 10 which in general includes a cup shaped capacitor body 12 having an open end and closed end, and which is carried within an electrically negative cup shaped case 14 on spring 16. Case 14 is generally cylindrical with a bottom end 15 and an open end 17. Cup shaped capacitor body 12 includes an outer metal shell 18 and a cup shaped tantalum liner 20 carried inside and against outer shell 18. A ring shaped tantalum cathode 22 is carried inside and against tantalum liner 20. An anode assembly includes a tantalum anode body 24 that is carried by a tantalum plate 26 that is bent over and under the rim 28 of liner 18 and shell 20. A Teflon gasket 30 electrically isolates the liner and shell from tantalum plate 26. Disposed between the tantalum cathode 22 and tantalum anode 24 is a liquid electrolyte 32. A 38% sulfuric acid based electrolyte would be suitable.

The electrically negative cup shaped case 14 is electrically isolated from the positive anode through a Mylar liner 34 and a ring shaped insulator 36. The open end of the case is closed by a metal plate 38 having a central aperture 40 through which a positive terminal 42 extends. Aperture 42 is sealed through a metal to glass seal 44. Plate 38 is sealed to outer case 14 through a solder seal 46. A negative terminal 48 extends from plate 38.

A copper disc 50 holds and electrically connects terminal 42 to tantalum plate 26. A plate 52 is secured to terminal 42 and is held against tantalum plate 26 to assure a positive electrical connection between terminal 42 and plate 26.

The tantalum cathode 22 is pressed following standard techniques and inserted into the tantalum liner 20. This assembly is then sintered using standard techniques to fuse the tantalum particles together and to fuse the particles to the tantalum liner. A tantalum pentoxide film is formed on the surface of the tantalum liner and the sintered tantalum cathode and the sintered tantalum anode following standard procedures. Such films serve as the capacitor dielectric.

The finished capacitor will withstand a reverse dc voltage up to 3 VDC continuously with no serious degradation of electrical characteristics. The finished capacitor will operate under high ripple current conditions for thousands of hours without any serious degradation of electrical characteristics or catastrophic failure.

What is claimed is:

1. A capacitor body comprising a metal shell having an open end and a closed end, a liner having an oxide film thereon carried against an inner surface of said shell, a sintered cathode of the same material as said liner and having an oxide film thereon carried against an inner surface of said liner, an anode spaced from said cathode, a liquid electrolyte disposed between said anode and said cathode, means closing said open end of said shell, and electrical terminals electrically connected to said anode and said tantalum cathode.

2. A capacitor body according to claim 1 wherein said liner is fabricated of tantalum.

3. A capacitor body according to claim 1 wherein said anode is fabricated of tantalum.

4. A capacitor body according to claim 1 wherein said liquid electrolyte is a 38% sulfuric acid based electrolyte.

5. A capacitor comprising
   a) an electrically negative outer case having a botom and a first open end,
   b) a capacitor body carried within and electrically connected to said case comprising a metal shell having a second open end and a closed end, a liner having an oxide film thereon carried against an inner surface of said shell, a sintered cathode of the same material as said liner and having an oxide film thereon carried against an inner surface of liner, an anode assembly spaced from said cathode and closing said second open end, and a liquid electroloyte disposed between said anode assembly and said cathode,
   c) closing means closing said first open end,
   d) isolation means, electrically isolating said anode assembly from said electrically negative outer case, and
   e) electrical terminals electrically connected to said anode assembly and said electrically negative case.

6. A capacitor according to claim 5 wherein said anode assembly includes a tantalum anode body carried by a tantalum plate, said tantalum plate closing said open end and extending over rims of said cup shaped metal shell and said tantalum liner.

7. A capacitor according to claim 5 wherein said isolation means includes a rubber base liner carried against an inner surface of said electrically negative outer case, and an electrically insulative gasket carried between said closing means and said anode assembly and against said inner surface of said electrically negative outer case.

8. A capacitor according to claim 5 wherein said liner is fabricated of tantalum.

9. A capacitor according to claim 5 wherein said liquid electrolyte is a 38% sulfuric acid based electrolyte.

* * * * *